US008522835B2

(12) United States Patent
McLean et al.

(10) Patent No.: US 8,522,835 B2
(45) Date of Patent: Sep. 3, 2013

(54) HYDROGEN SUPPLIES AND RELATED METHODS

(75) Inventors: Gerard F. McLean, West Vancouver (CA); Joerg Zimmermann, Vancouver (CA)

(73) Assignee: Société BIC, Clichy (FR)

( * ) Notice: Subject to any disclaimer, the term of this patent is extended or adjusted under 35 U.S.C. 154(b) by 0 days.

(21) Appl. No.: 13/529,483

(22) Filed: Jun. 21, 2012

(65) Prior Publication Data
US 2012/0255637 A1 Oct. 11, 2012

Related U.S. Application Data

(63) Continuation of application No. 11/538,027, filed on Oct. 2, 2006, now Pat. No. 8,215,342.

(60) Provisional application No. 60/721,984, filed on Sep. 30, 2005.

(51) Int. Cl.
*B67C 3/00* (2006.01)
*F17C 5/06* (2006.01)

(52) U.S. Cl.
CPC . *F17C 5/06* (2013.01); *Y02E 60/321* (2013.01)
USPC .............. 141/197; 141/11; 141/69; 141/94; 141/95; 141/192; 62/46.2

(58) Field of Classification Search
USPC .............. 141/2, 4, 11, 67, 69, 83, 85, 94, 95, 141/192, 197; 62/46.2
See application file for complete search history.

(56) References Cited

U.S. PATENT DOCUMENTS

| 4,155,712 | A | 5/1979 | Taschek |
| 4,211,537 | A | 7/1980 | Teitel |
| 5,202,195 | A | 4/1993 | Stedman et al. |
| 6,221,117 | B1 * | 4/2001 | Edlund et al. ..................... 48/76 |
| 6,274,093 | B1 | 8/2001 | Long et al. |
| 6,375,906 | B1 * | 4/2002 | Edlund et al. ................. 429/112 |
| 6,418,275 | B1 | 7/2002 | Yang |
| 6,506,360 | B1 | 1/2003 | Andersen et al. |
| 6,544,400 | B2 | 4/2003 | Hockaday et al. |
| 6,651,701 | B2 | 11/2003 | Kuriiwa et al. |
| 6,733,741 | B2 | 5/2004 | Nakamura |
| 6,745,801 | B1 | 6/2004 | Cohen |
| 6,932,847 | B2 | 8/2005 | Amendola et al. |

(Continued)

OTHER PUBLICATIONS

"U.S. Appl. No. 11/538,027 Non-Final Office Action mailed Sep. 29, 2010", 10.

(Continued)

*Primary Examiner* — Timothy L Maust
(74) *Attorney, Agent, or Firm* — Schwegman Lundberg & Woessner P.A.

(57) ABSTRACT

A hydrogen source comprises a first hydrogen reservoir for containing hydrogen in a first form and a second hydrogen reservoir for containing hydrogen in a second form different from the first form. The hydrogen source comprises a means for converting hydrogen from the first form to hydrogen gas and transferring the hydrogen gas from the first hydrogen reservoir to the second hydrogen reservoir. An interface is provided for transferring hydrogen from the second hydrogen reservoir to a hydrogen reservoir in a portable device. The interface comprises a fluidic coupling. The hydrogen source may be used to provide hydrogen fuel to a wide range of portable devices.

22 Claims, 9 Drawing Sheets

(56) References Cited

U.S. PATENT DOCUMENTS

| | | | |
|---|---|---|---|
| 7,128,103 B2* | 10/2006 | Mitlitsky et al. | 141/248 |
| 7,168,465 B2* | 1/2007 | Mitlitsky et al. | 141/231 |
| 7,216,040 B2* | 5/2007 | Copeman et al. | 702/24 |
| 7,312,440 B2* | 12/2007 | Degertekin et al. | 250/281 |
| 7,344,571 B2 | 3/2008 | Bae et al. | |
| 7,645,930 B2* | 1/2010 | Kelly et al. | 136/244 |
| 7,713,653 B2 | 5/2010 | Eickhoff et al. | |
| 7,727,647 B2* | 6/2010 | Eickhoff et al. | 205/637 |
| 7,811,529 B2 | 10/2010 | Powell et al. | |
| 7,883,805 B2 | 2/2011 | Nakai et al. | |
| 7,976,786 B2 | 7/2011 | Damery et al. | |
| 8,215,342 B2* | 7/2012 | McLean et al. | 141/11 |
| 2002/0100682 A1 | 8/2002 | Kelley et al. | |
| 2002/0119355 A1 | 8/2002 | Shimada et al. | |
| 2003/0162059 A1 | 8/2003 | Gelsey | |
| 2004/0086755 A1* | 5/2004 | Kalal | 429/19 |
| 2004/0123898 A1 | 7/2004 | Yamashita et al. | |
| 2005/0106097 A1 | 5/2005 | Graham et al. | |
| 2006/0057040 A1 | 3/2006 | Shih et al. | |
| 2006/0065302 A1* | 3/2006 | Gibson et al. | 136/291 |
| 2007/0084879 A1 | 4/2007 | McLean et al. | |

OTHER PUBLICATIONS

"U.S. Appl. No. 11/538,027, Final Office Action mailed Dec. 6, 2011", 9 pgs.

"U.S. Appl. No. 11/538,027, Notice of Allowance mailed Mar. 7, 2012", 5 pgs.

"U.S. Appl. No. 11/538,027, Response filed Feb. 25, 2011 to Non Final Office Action mailed Sep. 29, 2010", 14 pgs.

"U.S. Appl. No. 11/538,027, Response filed Feb. 14, 2012 to Non Final Office Action mailed Dec. 6, 2011", 10 pgs.

"U.S. Appl. No. 11/538,027, Restriction Requirement mailed Jun. 24, 2010", 6 Pgs.

"U.S. Appl. No. 11/538,027, Restriction Requirement mailed Oct. 19, 2011", 5 pgs.

"U.S. Appl. No. 11/538,027, Preliminary Amendment filed Mar. 5, 2008", 14.

\* cited by examiner

HYDROGEN SUPPLIES AND RELATED METHODS

CROSS REFERENCE TO RELATED APPLICATION

This application is a continuation application of U.S. patent application Ser. No.: 11/538,027, filed Oct. 2, 2006; which non-provisional application claims the benefit of priority under 35 U.S.C. §119(e) to U.S. Provisional Patent Application Ser. No. 60/721,984 filed on Sep. 30, 2005, which applications are herein incorporated by reference in their entirety.

TECHNICAL FIELD

This invention relates to methods and apparatus for supplying hydrogen to portable devices. The invention has application, for example, in supplying hydrogen to portable electronic devices powered by hydrogen fuel cells.

BACKGROUND

A wide range of portable devices are available. Some examples of such devices are: music players; media players; radio receivers; radio transceivers; global positioning systems; portable telephones (including cellular telephones, satellite telephones, radiotelephones and portable telephone handsets); CD players; portable computers; ultra-mobile computers; calculators; electronic games; personal digital assistants (PDAs); electrical testing equipment; flashlights; power tools; radio beacons and the like. These portable devices can be carried by hand. Because of their portable nature they may be used in a wide variety of different locations.

Portable electrically-powered devices may obtain electrical power from primary or secondary electrical batteries. Batteries have disadvantages as power sources including cost, possible environmental problems associated with manufacturing batteries and disposing of spent batteries and, in the case of secondary batteries, undesirably long recharging times.

Solar cells are used to power some portable devices. However, solar cells have the disadvantages that they only generate electricity when exposed to light and a large area of solar cells would be required to generate sufficient power for some devices.

Fuel cells can be a good source of electrical power for portable electrically-powered devices. Fuel cells convert chemical energy from a fuel directly into electricity (without combustion) by way of an electrochemical reaction. Fuel cells can be made to consume various fuels such as hydrogen, methanol, butane, formic acid, and borohydride compounds.

Hydrogen is attractive as a fuel since it is readily available and the by-product of the operation of a hydrogen fuel cell is water. Hydrogen may be supplied in the form of a high-pressure compressed gas. The use of a compressed gas reservoir to fuel portable devices is not ideal for a number of reasons. These include:

Cylinders or other vessels for storing compressed hydrogen are subject to stringent compressed gas codes and standards. Such vessels may not be readily approved for distribution and use in light-duty commercial or domestic environments.

Compressed gas may be perceived as dangerous by some. This attitude toward compressed gas may interfere with widespread consumer adoption of devices which require users to handle compressed hydrogen.

Vessels for holding compressed gas are not inexpensive. Commercially practical schemes for distributing compressed gas would typically involve delivery and exchange of cylinders of compressed hydrogen. Exchanging gas cylinders may prove difficult to implement in consumer settings.

Compressed hydrogen has a relatively low energy density in comparison to some other fuels.

There remains a need for convenient, cost-effective methods and apparatus that can be used to provide hydrogen for use in portable devices and for portable devices suitable for use with such methods and apparatus.

BRIEF DESCRIPTION OF THE DRAWINGS

Exemplary embodiments are illustrated in the appended drawings. The embodiments and figures disclosed herein are intended to be illustrative and not restrictive.

DESCRIPTION

Throughout the following description specific details are set forth in order to provide a thorough understanding of the invention to persons skilled in the art. However, well known elements may not have been shown or described in detail to avoid unnecessarily obscuring the disclosure. Accordingly, the description and drawings are to be regarded in an illustrative, rather than a restrictive, sense.

This invention provides an apparatus and methods for refueling hydrogen-powered portable devices. The apparatus comprises at least two different reservoirs for storing hydrogen. The hydrogen is in a first form in the first hydrogen reservoir and a second form in the second hydrogen reservoir. The apparatus includes means for converting hydrogen from the first form into the second form. Converting the hydrogen from the first to the second form comprises changing at least one characteristic of the hydrogen somehow. For example, in some cases the hydrogen is chemically combined differently in the first and second hydrogen reservoirs.

The first form is selected to provide convenient storage of hydrogen. In some embodiments the first hydrogen reservoir contains sufficient hydrogen to fill the second hydrogen reservoir at least twice. The first form is chosen to suit criteria such as:

acceptability to users;
safety (non-toxic, non-flammable and/or non-explosive);
long shelf-life;
low cost;
convenient availability;
large hydrogen capacity; and/or
volumetric efficiency.

In various embodiments, the first form is:
- a dry solid that can yield hydrogen gas by way of hydrolysis;
- a dry solid that can yield hydrogen gas by way of thermolysis;
- a liquid which can be reformed or otherwise converted to yield hydrogen gas;
- a highly compressed gas.

Hydrogen stored in such forms is not always suitable for direct use in fueling a hydrogen-powered device.

The second form is selected to facilitate safe, rapid fueling of one or more portable devices. In some but not all embodiments, the hydrogen capacity of the second hydrogen reservoir is small in comparison to that of the first hydrogen reservoir. In some embodiments, hydrogen is not transferred into the second hydrogen reservoir while hydrogen is being transferred into a portable device.

The capacity of the second hydrogen reservoir may be selected to at least equal an amount of hydrogen that one desires to be available for transfer to portable devices at one time. This amount will depend upon the number of portable devices the apparatus is expected to be able to fuel before it becomes necessary to replenish the second hydrogen reservoir as well as the amount of hydrogen likely to be required by each portable device. The second hydrogen reservoir could, for example, have a hydrogen capacity sufficient to refill three or four typical fuel-cell-powered portable devices without receiving more hydrogen from the first hydrogen reservoir.

Figure 1:
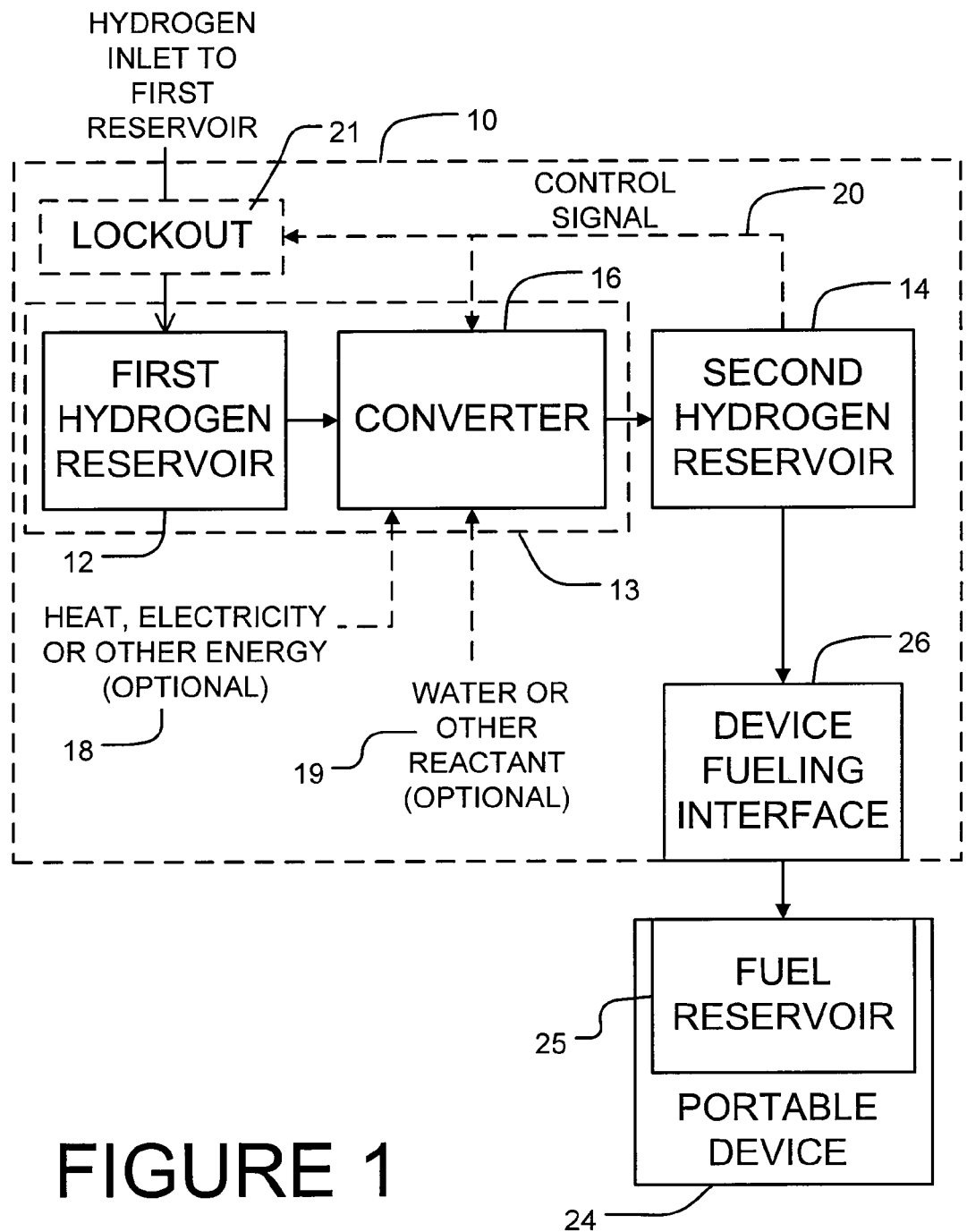
FIG. 1 shows major components of a hydrogen supply according to an embodiment of the invention.

FIG. 1 is a block diagram showing major components of a hydrogen supply apparatus 10 according to an example embodiment of the invention. Hydrogen supply 10 comprises a first hydrogen reservoir 12, which may be refillable. First hydrogen reservoir 12 is connected to supply hydrogen to a second hydrogen reservoir 14 by way of a converter 16. Converter 16 converts the hydrogen from the first form in which the hydrogen initially exists in first hydrogen reservoir 12 to the second form in which the hydrogen exists in second hydrogen reservoir 14. As indicated by the dashed box 13, in some embodiments the functions of first hydrogen reservoir 12 and converter 16 are combined.

Converter 16 may operate at a rate different from the rate at which a portable device is fueled from second hydrogen reservoir 14. For example, if an apparatus 10 is used to fuel a portable device for 5 minutes per day, converter 16 may take up to almost 24 hours to convert an amount of hydrogen sufficient to fill second hydrogen reservoir 14 with sufficient hydrogen for the fueling. Some conversion processes generate heat or require the input of heat. Where converter 16 operates relatively slowly, the input or dissipation of heat can be distributed over the time taken for the conversion. This reduces the heat flux into or out of the system significantly.

Apparatus 10 comprises a device fueling interface 26 which permits apparatus 10 to be detachably coupled to a portable device 24. When a portable device 24 is coupled to fueling interface 26, hydrogen is transferred from second hydrogen reservoir 14 to a fuel reservoir 25 in portable device 24 by way of fueling interface 26. Device 24 may comprise, for example:
- a portable device powered by a hydrogen fuel cell and having an internal hydrogen reservoir (the hydrogen reservoir may integral or removable in normal operation);
- a satellite cartridge for use in fueling other portable devices;
- a replaceable fuel cartridge for use with a fuel-cell-powered system; or
- combinations thereof.

Device refueling interface 26 includes a fluidic coupling for carrying hydrogen between apparatus 10 and a portable device 24 and may also comprise one or more of:
- a mechanical safety latch,
- a means for protecting against overpressure, such as a pressure-relief valve,
- a pressure or flow regulator,
- electrical (data transfer) connectors,
- electrical power connectors,
- combinations thereof, and
- the like.

In some embodiments, interface 26 comprises one or more interchangeable adaptors. Apparatus 10 can be made to interface to portable devices 24 of various configurations by selecting and installing an appropriate adaptor. Such adaptors are described in U.S. patent application Ser. No. 60/719,604 entitled REFUELING STATION filed 23 Sep. 2005 and the co-pending United States patent application filed on 25 Sep. 2006 and entitled REFUELING STATION, both of which are hereby incorporated herein by reference.

Figure 1A:
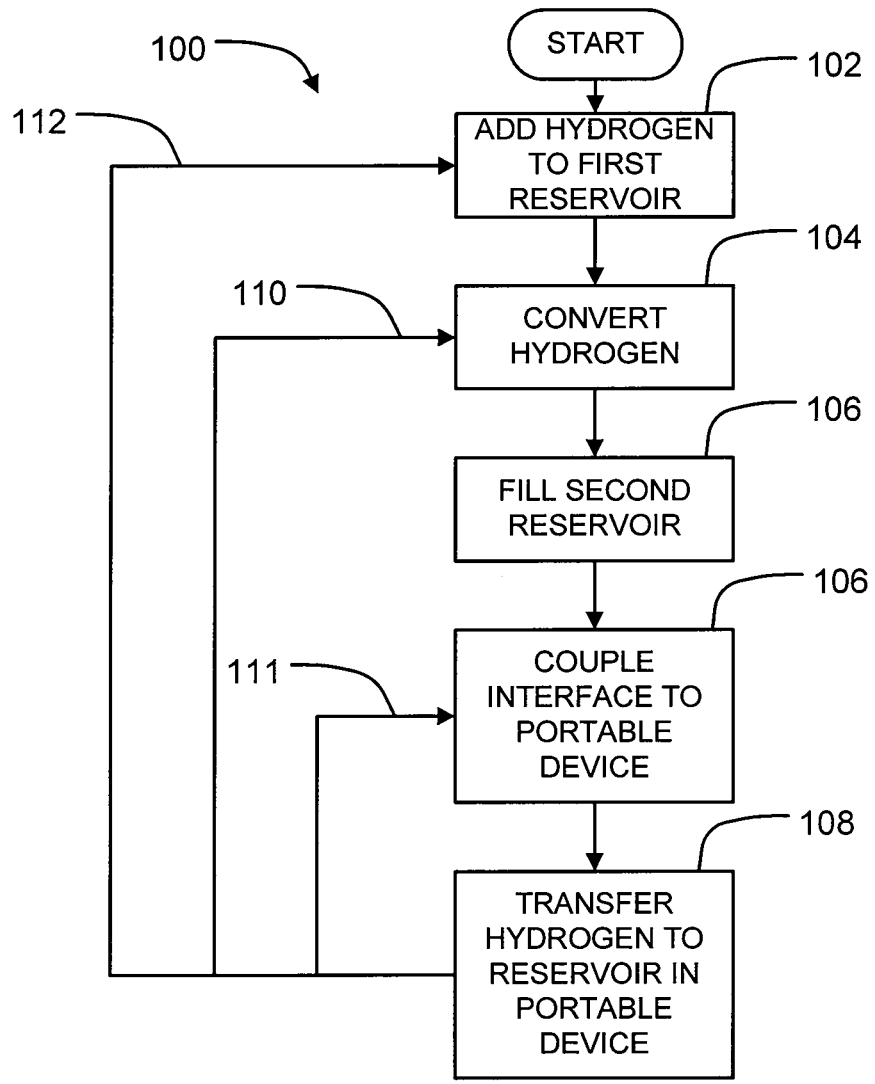
FIG. 1A is a flow chart illustrating a method according to an embodiment of the invention.

FIG. 1A shows a method 100 according to an embodiment of the invention. In block 102 hydrogen is introduced into first hydrogen reservoir 12 in the first form. Block 102 may comprise, for example:
- introducing a pellet, powder, capsule, or the like of a solid hydrogen-containing material into first hydrogen reservoir 12;
- introducing a liquid into first hydrogen reservoir 12;
- introducing pressurized hydrogen into first hydrogen reservoir 12;
- connecting to apparatus 10 a first hydrogen reservoir 12 that has been pre-filled with hydrogen gas or a solid/liquid or gaseous hydrogen-containing material.

In block 104 hydrogen from first hydrogen reservoir 12 is converted into the second form and transferred into second hydrogen reservoir 14. In block 104, second hydrogen reservoir 14 is filled. In block 106 a portable device 24 is placed in fluid communication with second hydrogen reservoir 14 by way of interface 26. In block 108 hydrogen is transferred from second hydrogen reservoir 14 through interface 26 to a reservoir 25 of portable device 24.

In some embodiments, it is possible to perform loop 110, two or more times before it is necessary to return to block 102. In some embodiments, the second hydrogen reservoir 14 may contain sufficient hydrogen to fuel two or more portable devices (or to fuel one portable device 24 more than once). In such embodiments, blocks 106 and 108 may be repeated two or more times, as indicated by loop 111, before returning to block 102 or 104. Method 100 returns to block 102 as indicated by loop 112 when it is necessary or desirable to replenish the supply of hydrogen in first reservoir 12.

The type of converter 16 provided in apparatus 10 is dependent upon the nature of the first and second forms of hydrogen. In some embodiments converter 16 requires an input of energy and/or water or other reactant to facilitate conversion of the hydrogen from the first form to the second form. In such embodiments, apparatus 10 includes a source 18 of energy and/or a source 19 of water or other reactant(s). Energy source 18 may provide heat or electricity to converter 16. Heat may be generated using electricity originating from outside of apparatus 10, an on-board heater, or by any other suitable means for heating an element.

Apparatus 10 may comprise a control system that regulates the operation of converter 16 to avoid over filling second hydrogen reservoir 14. In the illustrated embodiment, second hydrogen reservoir 14 provides a control signal 20 to converter 16. Control signal 20 may regulate how much hydrogen is provided to second hydrogen reservoir 14 and/or the rate at which hydrogen is delivered to second hydrogen reservoir 14. The control signal may perform one or more of:
- turning off (or regulating up or down) the operation of converter 16;
- blocking or permitting the transfer of hydrogen into second hydrogen reservoir 14 (for example by closing and opening a valve;
- blocking or permitting the introduction of additional hydrogen or hydrogen-containing material into first hydrogen reservoir 12 (for example by opening or closing a valve or closing and opening a mechanical lock-out 21 that prevents adding more hydrogen-containing material to first hydrogen reservoir 12).

Control signal 20 may comprise an analog or digital electrical signal, a mechanical signal (which may comprise a force, motion, or distortion of an element or linkage or a pneumatic or hydraulic signal or the like), or another suitable means for transferring information.

In some embodiments, when second hydrogen reservoir 14 is full (e.g. second hydrogen reservoir 14 comprises at least a threshold amount of hydrogen), no hydrogen is allowed to be converted and transferred from first hydrogen reservoir 12 to second hydrogen reservoir 14. If second hydrogen reservoir 14 is at least partially depleted, the transfer of hydrogen from first hydrogen reservoir 12 to second hydrogen reservoir 14 is initiated. In this manner second hydrogen reservoir 14 can be maintained at a state of readiness to fuel one or more portable devices.

Where second hydrogen reservoir contains sufficient hydrogen to fuel a portable device 24, the rate at which hydrogen is converted and transferred to second hydrogen reservoir 14 can be completely independent of the rate at which hydrogen is transferred from second hydrogen reservoir 14 to a portable device 24 during fueling. In some embodiments, hydrogen is converted quite slowly and is accumulated in second hydrogen reservoir 14 over time for later use. In some embodiments, hydrogen is converted relatively quickly and is accumulated in second hydrogen reservoir 14 over a relatively short period of time for later use.

Where control signal 20 operates a lockout 21, control signal 20 may comprise a mechanical signal that moves lockout 21 into a blocking configuration in response to an increase in pressure within first hydrogen reservoir 12, second hydrogen reservoir 14, or both hydrogen reservoirs 12 and 14. For example lockout 21 could:
- distort a fitting such as a screw thread, socket or the like or move a member in the proximity of the fitting so that the fitting cannot be coupled to a corresponding fitting on an external supply of hydrogen or hydrogen-containing material.
- lock a cap or other closure in a closed configuration to prevent a user from inserting additional hydrogen-containing material into the first reservoir.
- close a valve to prevent additional hydrogen-containing material from entering the first reservoir, or the like.

In some embodiments, the second hydrogen reservoir comprises a hydrogen-storing material that tends to expand as it takes up hydrogen. In some such embodiments signal 20 comprises a mechanical signal generated by the expansion of the hydrogen-storing material.

EXAMPLES

An example means for storing hydrogen in the second hydrogen reservoir is as a compressed gas. The pressure is sufficient to drive the transfer of hydrogen into a reservoir 25 in a portable device 24 by way of interface 26. For instance, where portable device 24 comprises a hydrogen reservoir 25 that comprises a hydrogen-storing material (such as a reversible metal hydride, a suitable zeolite, activated carbon, carbon nanotubes, or other suitable material that is capable of occluding and subsequently desorbing hydrogen) then the pressure within second hydrogen reservoir 14 may be maintained at a pressure that is higher than a charging pressure of the hydrogen-storing material. Compressed hydrogen may be used to refuel a variety of portable devices which may store hydrogen as a compressed gas or in combination with a metal-hydride or other hydrogen-storing material.

Figure 2:
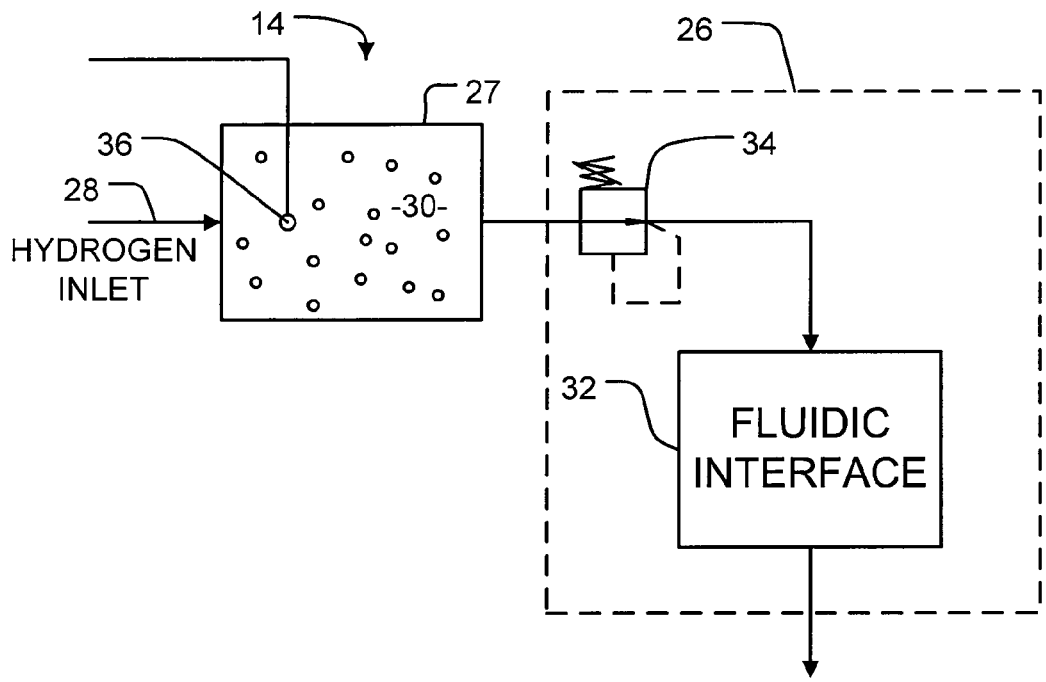
FIG. 2 shows a second hydrogen reservoir as may be used in some embodiments of the invention.

FIG. 2 shows a specific embodiment of second hydrogen reservoir 14 and device refueling interface 26. In this embodiment, hydrogen reservoir 14 comprises a pressure vessel 27. Hydrogen 30 is introduced into pressure vessel 27 through hydrogen inlet 28. When a device 24 requires refueling, it is connected to fluidic interconnect 32 and hydrogen 30 is allowed to flow through an output regulator 34 into the hydrogen reservoir 25 of the device 24 being refueled.

A pressure sensor 36 may be provided in pressure vessel 27 to provide feedback to components of apparatus 10 that control the flow of hydrogen into second hydrogen reservoir 14. In this manner, second hydrogen reservoir 14 can be maintained at a constant state of readiness for refueling one or more portable hydrogen powered devices. The amount of hydrogen stored in second hydrogen reservoir 14 in this embodiment is determined by the physical size of pressure vessel 27 and the internal operating pressure. For example, a 1 liter pressure vessel operating with a maximum pressure of 100 bar could contain about 100 standard liters of hydrogen. The amount of hydrogen that could actually be transferred into internal hydrogen reservoirs 25 of portable devices 24 would depend upon the internal operating pressures and volumes of hydrogen reservoirs 25.

Figure 3:
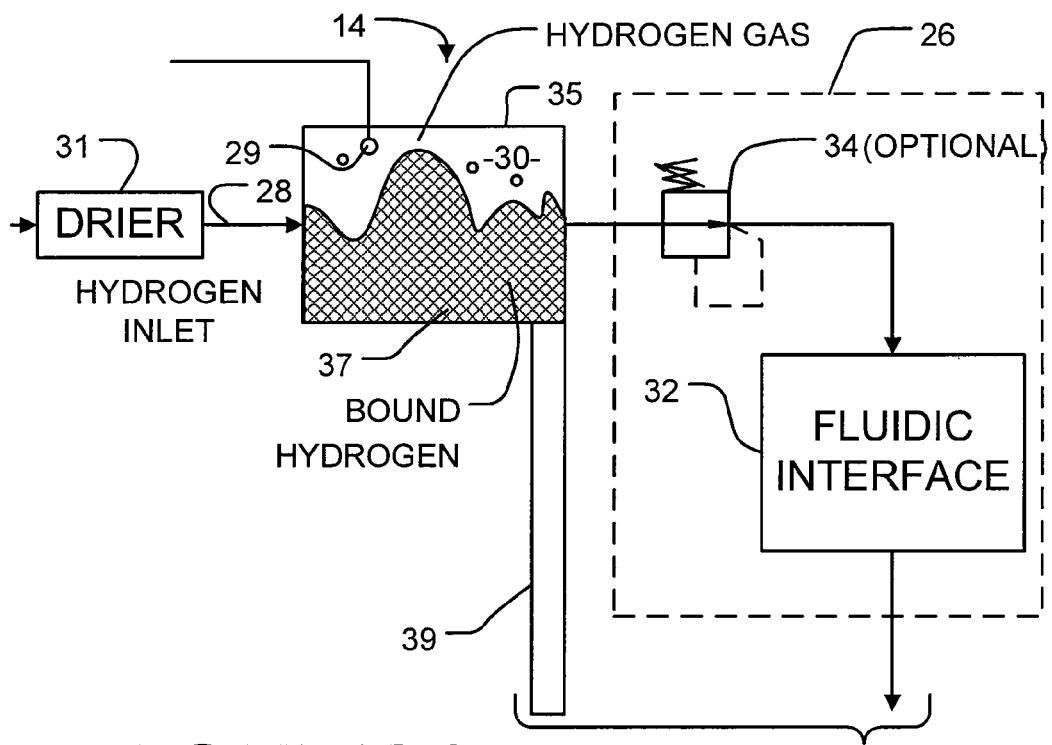
FIG. 3 shows another second hydrogen reservoir as may be used in some embodiments of the invention.

FIG. 3 shows another construction for second hydrogen reservoir 14. The FIG. 3 embodiment provides a hydrogen-storing material 37 such as a reversible metal-hydride, a zeolite, a carbon-based hydrogen-storing material (e.g. suitable activated carbon or carbon nanotube materials) or some combination thereof to store hydrogen. Second hydrogen reservoir 14 shown in FIG. 3 comprises a vessel 35 which is at least partially filled with a hydrogen-storing material 37.

Hydrogen-storing material 37 may be selected to desorb hydrogen at a plateau pressure suitable for fueling portable devices 24. Hydrogen-storing material 37 improves the volumetric efficiency of second hydrogen reservoir 14. Furthermore, if hydrogen reservoir 25 of portable device 24 also comprises a hydrogen-storing material then there is an opportunity for synergistic thermal interaction that may facilitate accelerated transfer of hydrogen into the hydrogen reservoir 25 of the portable device. Interface 26 may include a thermally-conductive pathway 39 that puts hydrogen-storing material 37 in thermal contact with a hydrogen-storing material in reservoir 25 of a portable device 24 being fueled with hydrogen. Such synergistic thermal interactions are described in U.S. patent application Ser. No. 60/719,603 filed on 23 Sep. 2005 and entitled METHOD AND APPARATUS FOR REFUELING REVERSIBLE METAL HYDRIDE HYDROGEN STORAGE SYSTEM and the co-pending United States patent application filed on 25 Sep. 2006 and entitled METHODS AND APPARATUS FOR REFUELING REVERSIBLE HYDROGEN-STORAGE SYSTEMS which are both hereby incorporated herein by reference. If hydrogen reservoir 25 of portable device 24 also comprises a hydrogen-storing material then the properties of the hydrogen-storing materials may be related as described in the above-noted patent applications.

When the second hydrogen reservoir comprises a hydrogen-storing material 37 such as a reversible metal hydride, pressure within the second hydrogen reservoir 14 may be allowed to temporarily reach a high value as hydrogen is transferred into second hydrogen reservoir 14 from first hydrogen reservoir 12. As the hydrogen-storing material occludes the hydrogen the pressure in second hydrogen reservoir 14 will drop.

As an example of such an embodiment, hydrogen from a pre-measured amount of a suitable hydrogen-containing material may be converted to hydrogen gas by hydrolysis or thermolysis in first reservoir 12. The thermolysis or hydrolysis may convert hydrogen more rapidly than the hydrogen can be taken up by hydrogen-storing material 37. As a consequence, the pressure within the first and second reservoirs 12 and 14 may rise to a level that is significantly greater than the plateau (or "desorption") pressure of hydrogen-storing material 37. As the hydrogen-storing material takes up hydrogen, the pressure within second reservoir 12 will drop until it reaches an equilibrium value that may be at or above the plateau pressure of hydrogen-storing material 37.

A hydrogen-storing material 37 may operate to remove impurities from hydrogen before the hydrogen is transferred to a portable device 24. For example, hydrogen from reformed diesel fuel may contain sulfur impurities. When the hydrogen is occluded by suitable hydrogen-storage material such as a hydride bed (e.g. combines with the hydride bed by absorption or adsorption or some other mechanism) and is subsequently desorbed from the hydride bed, the sulfur impurities will be left behind. The hydride bed implicitly provides the function of filtering the converted hydrogen.

In some embodiments, hydrogen-storing material 37 tends to expand as it takes up hydrogen. In some such embodiments, hydrogen storing material 37 is adjacent to a wall or other movable member that is displaced slightly by expansion of hydrogen-storing material 37. The magnitude of the displacement is one measure of the amount of hydrogen in the second reservoir. Pressure in excess of a plateau pressure of the hydrogen-storing material is another measure of the amount of hydrogen in the second reservoir. In some embodiments a lockout mechanism 21

(See FIG. 1) is operated in response to expansion of the hydrogen-storing material as it takes up hydrogen. When the expansion (or a force resulting from the expansion) increase to a value that indicates that the second reservoir contains at least a threshold quantity of hydrogen then the lockout mechanism is actuated.

In an embodiment wherein the first reservoir includes a port through which additional hydrogen-containing material can be introduced into the first reservoir and that port is associated with a closure of some type then the lockout mechanism may comprise, for example, a mechanism that locks the closure in a closed configuration, thereby inhibiting the introduction of hydrogen-containing material into the first reservoir.

In some embodiments the closure comprises a cap or the like closed by a threaded coupling and the lockout mechanism comprises a deformation of threads of the threaded coupling that is caused by expansion of hydrogen-storing material 37. A wide range of other lockout mechanisms may be actuated in response to expansion of hydrogen-storing material 37 or pressure within second reservoir 14, or some combination thereof.

First hydrogen reservoir 12 may contain a reasonably large mass of hydrogen in a convenient, safe and efficient form.

Figure 4:
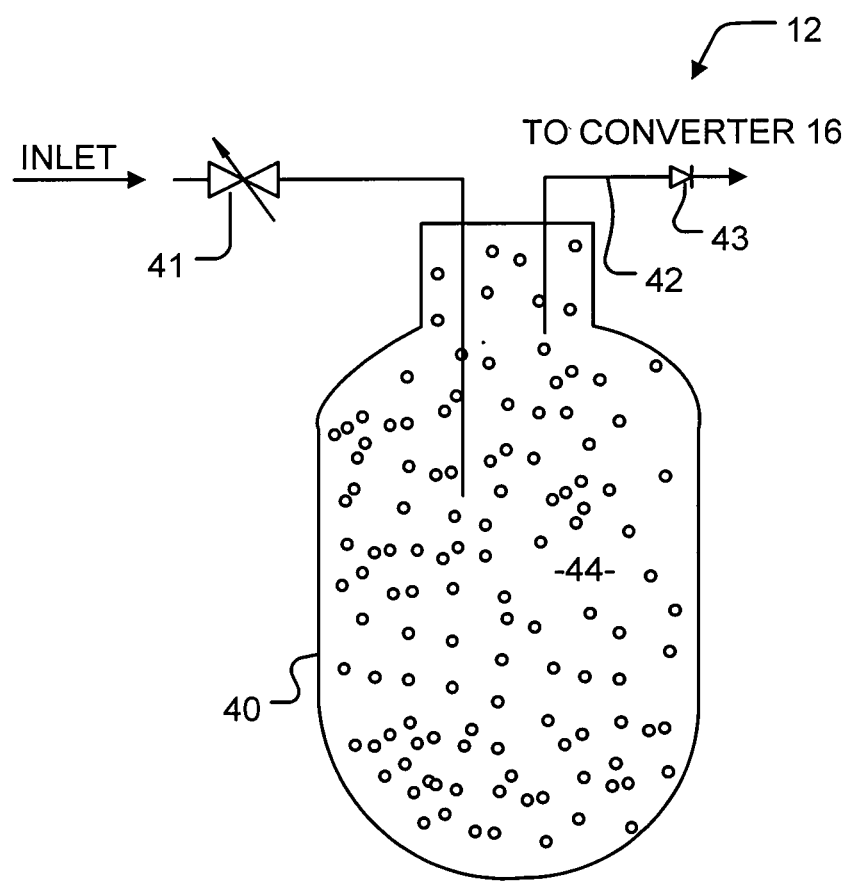
FIG. 4 shows a first hydrogen reservoir of a type that may be used in some embodiments of the invention.

An example of a first hydrogen reservoir 12 is shown schematically in FIG. 4. In the FIG. 4 embodiment, hydrogen is stored as a compressed gas at a pressure high enough to achieve a desired storage density of hydrogen. Hydrogen reservoir 12 comprises a pressure vessel 40 containing high pressure compressed hydrogen 44. Pressure vessel 40 may be a conventional metal pressure vessel or a composite pressure vessel, for example.

Pressure vessel 40 has an outlet 42 which can carry hydrogen to converter 16. A check valve 43 is provided to prevent hydrogen from flowing back into pressure vessel 40 from converter 16. Refilling valve 41 and the outlet to converter 16 could optionally be the same valve. Optionally, pressure vessel 40 may also comprise other features such as a pressure relief device or an inlet pressure regulator.

Providing compressed hydrogen gas in first hydrogen reservoir 12 may be convenient in situations where hydrogen can be readily sourced from a supply of industrial compressed gas. First hydrogen reservoir 12 may be removable from apparatus 10 to facilitate the replacement of a depleted pressure vessel 40 with a full pressure vessel 40.

Figure 4A:
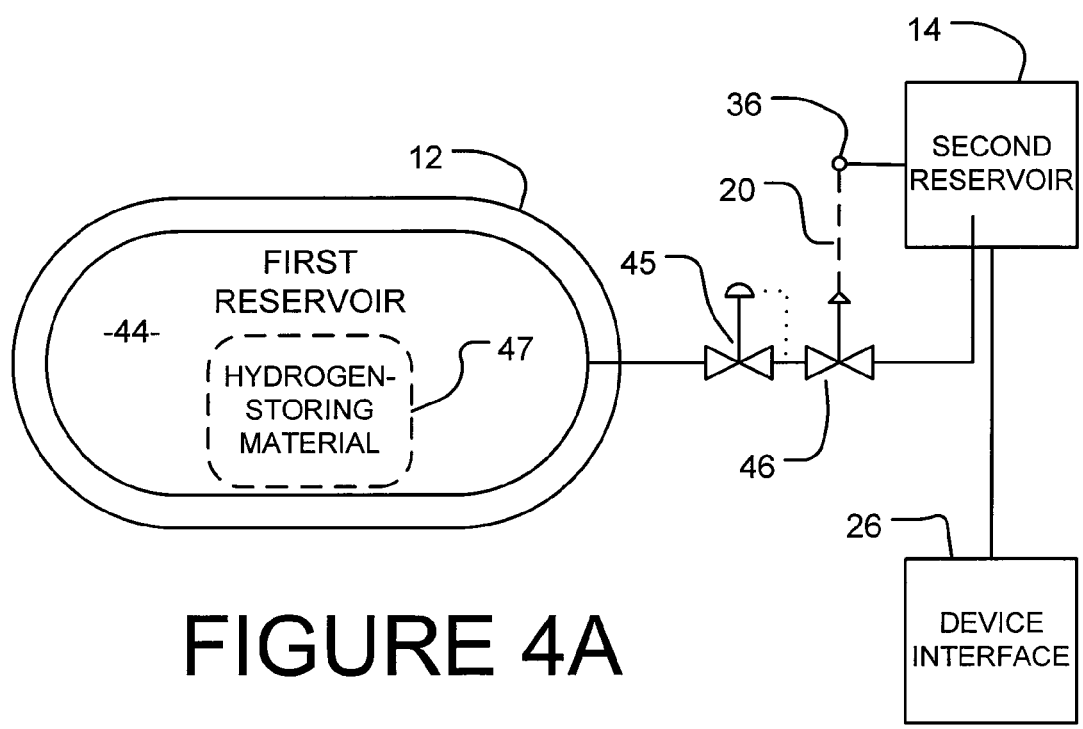
FIG. 4A shows schematically a hydrogen supply system according to another embodiment of the invention.

When first hydrogen reservoir 12 contains compressed hydrogen, converter 16 may comprise a pressure regulator that delivers hydrogen to second hydrogen reservoir 14 at a pressure that is less than the pressure in first hydrogen reservoir 12. The pressure of hydrogen in second hydrogen reservoir 14 may be held roughly constant. FIG. 4A shows an example of such a system. In embodiments where the amount of hydrogen in the first hydrogen reservoir is matched to the capacity of the second hydrogen reservoir, no feedback mechanism (other than any appropriate safety mechanism) is required.

In other embodiments, converter 16 comprises an intermediate chamber which can be placed in fluid communication with first hydrogen reservoir 12 by way of a first valve and can be placed in fluid communication with the second hydrogen reservoir 14 by way of a second valve. The intermediate chamber can be filled with hydrogen. By opening the first and second valves in alternation, small quantities of high-pressure hydrogen can be transferred into second hydrogen reservoir 14 which remains at a lower pressure.

The pressure of compressed hydrogen gas 44 in first hydrogen reservoir 12 may be much higher than the pressure at which it is desired to deliver hydrogen to portable devices 24.

FIG. 4A shows example apparatus in which high-pressure hydrogen 44 from a first hydrogen reservoir 12 passes through a regulator 45 which reduces its pressure. The hydrogen is then delivered into second hydrogen reservoir 14. A control valve 46 operates in response to an electrical or mechanical signal 20 from a sensor 36 in second hydrogen reservoir 14 to keep the second hydrogen reservoir charged with hydrogen.

In some embodiments, hydrogen is stored in a liquid hydrogen-containing material in first hydrogen reservoir 12. For example, hydrogen can be liberated from water, ammonia, hydrazine, silanes, hydrocarbons, liquid chemical hydrides, or aqueous chemical hydrides such as aqueous sodium borohydride or potassium borohydride. These materials may be used to provide first hydrogen reservoir 12 with a very high hydrogen content, easy transportation and replenishment, safety and potentially low cost.

Figure 5:
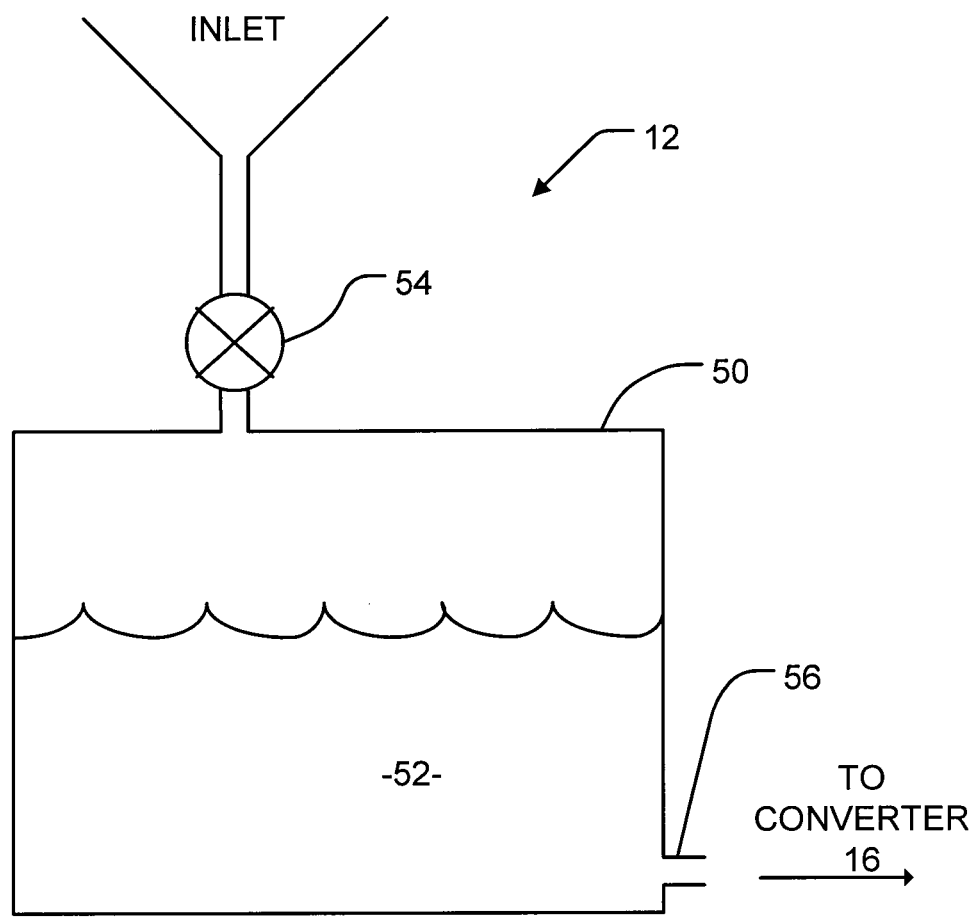
FIG. 5 shows another type of first hydrogen reservoir as may be used in some embodiments of the invention.

FIG. 5 is a schematic view of a first hydrogen reservoir 12 comprising a container 50 holding a liquid hydrogen-containing material 52. Container 50 comprises an inlet valve 54 and an outlet 56 to converter 16. Optionally, a two-way inlet valve may be provided so that a single port can be selectively placed in fluid communication with an inlet or converter 16. Container 50 may comprise any material suitable for containing liquid hydrogen-containing material 52. Container 50 may optionally comprise a pressure relief device or other safety features.

When hydrogen is stored in first hydrogen reservoir 12 in the form of a hydrogen-containing hydrocarbon liquid (such as diesel fuel, for example), converter 16 may perform hydrogen cracking or reformation to produce hydrogen gas for delivery to second hydrogen reservoir 14. In such cases there may be a residual by-product of the hydrogen dissociation process. Such residue may be either left to accumulate in apparatus 10 or inside the storage system or discharged by way of an optional discharge port (not shown).

In some embodiments, converter 16 may comprises a hydrolysis reactor in which a hydrogen-containing liquid from first hydrogen reservoir 12 undergoes a hydrolysis reaction. In various embodiments:

The hydrogen-containing liquid comprises an aqueous solution that undergoes a hydrolysis reaction upon exposure to a catalyst in converter 16;

The hydrogen-containing liquid is mixed with water in converter 16 and undergoes hydrolysis directly; or The hydrogen-containing liquid is mixed with water and the resulting solution undergoes hydrolysis upon contact with a catalyst in converter 16.

Silanes such as disilane or trisilane are examples of pure liquid fuels that may hydrolyze directly with water producing only hydrogen and silica as products.

In other embodiments, converter 16 comprises an electrolyzer which breaks down water into hydrogen and oxygen streams. The electrolyzer may produce hydrogen at a comparatively low rate provided it is able, on average, to keep up with the demand. If a sustainable and renewable source of electricity is provided for the electrolyzer (such as a solar panel), converter can generate hydrogen indefinitely so long as there is a supply of water in first hydrogen reservoir 12. The availability of such an apparatus 10 permits portable electronic devices powered by hydrogen fuel cells to be operated away from other energy sources indefinitely as long as there is a suitable supply of hydrogen or a suitable hydrogen-containing material.

Other types of converter 16 may be provided, as appropriate, for liberating hydrogen from specific hydrogen-containing materials. For example, converter 16 may comprise a galvanic cell which generates hydrogen by way of an electrochemical reaction.

In other embodiments, hydrogen is present in first hydrogen reservoir 12 in the form of solid-state hydrogen-containing materials. The solid hydrogen-containing materials may be present in first hydrogen reservoir 12 in the form of pellets, powders, or the like. Solid hydrogen-containing materials may be packaged forms that are convenient for consumer use. For example, a dry hydride 'puck' can be created, or a powder bed can be encapsulated in a container to avoid contact with humans. The container may be made of plastic, metal or another suitable material, such as Teflon™ or other polymer. A consumer may take a package of hydrogen-containing material and insert it into apparatus 10 to generate hydrogen for powering portable devices.

The hydrogen-containing material may be provided in a pre-measured form that will produce a known mass of hydrogen upon conversion. The amount of hydrogen-containing material may be selected so that the mass of hydrogen generated by complete conversion of the pre-measured hydrogen-containing material will not be excessive for apparatus 10. In such cases it is not necessary to control the rate of conversion of the hydrogen-containing material (whether by reaction with water, heating, or otherwise) or accurately meter the hydrogen-containing material since the amount of hydrogen that can be generated is limited by the amount of hydrogen-containing material in the pre-measured form.

Some example solid-state hydrogen-containing materials are: sodium borohydride, potassium borohydride, lithium borohydride, lithium alanate, sodium alanate, borazane, ammonium chloride, ammonium fluoride, magnesium hydride, titanium hydride, iron magnesium hydride or combinations thereof.

Chemical hydrides provide a means for generating hydrogen through a variety of reactions. Table 1 shows some common chemical hydrides and their hydrogen-generating reactions.

TABLE 1

Example hydrogen-generating chemical reactions.

| Reactants | Products | Wt. % $H_2$ Released |
|---|---|---|
| $2Al + 6H_2O + 2KOH$ | $3H_2 + 2KAl(OH)_4$ | 2.2 |
| $NaH + H_2O$ | $H_2 + NaOH$ | 4.8 |
| $CaH_2 + 2H_2O$ | $2H_2 + Ca(OH)_2$ | 5.2 |
| $2NaSi + 5H_2O$ | $Na_2Si_2O_5 + 5H_2$ | 5.24 |
| $MgH_2 + 2H_2O$ | $2H_2 + Mg(OH)_2$ | 6.5 |
| $Mg(AlH_4)_2 + 8H_2O$ | $8H_2 + Mg(OH)_2 + Al(OH)_3$ | 7.0 |
| $MgFeH_6 + Heat$ | $Mg + Fe + 3H_2$ | 7.0 |
| $LiAlH_4 + 4H_2O$ | $4H_2 + LiOH + Al(OH)_3$ | 7.3 |
| $NaBH_4 + 4H_2O$ | $4H_2 + H_3BO_3 + NaOH$ | 7.3 |
| $MgH_2 + Heat$ | $Mg + H_2$ | 7.7 |
| $LiH + H_2O$ | $H_2 + LiOH$ | 7.7 |
| $2LiAlH_4 + Heat$ | $2LiH + 2Al + 3H_2$ | 8.0 |
| $Al(BH_4)_3 + 12H_2O$ | $Al(OH)_3 + 3H_3BO_3 + 12H_2$ | 8.4 |
| $HCl + 3H_2O + NaBH_4$ | $NaCl + H_3BO_3 + 4H_2$ | 8.6 |
| $LiBH_4 + 4H_2O$ | $4H_2 + LiOH + H_3BO_3$ | 8.6 |
| $LiAlH_4 + NH_4Cl$ | $LiCl + AlN + 4H_2$ | 8.8 |
| $Si_2H_6 + 4H_2O$ | $2SiO_2 + 7H_2O$ | 11.0 |
| $N_2H_4 + Catalyst$ | $2H_2 + N_2$ | 12.5 |
| $0.85 Mg(BH_4)_2 \cdot 2NH_3 + 0.075LiNO_3 + 0.075PTFE$ | 99.8% pure $H_2$ | 12.84 |
| $H_3BNH_3 + Heat$ | $HBNH_x + 2H_2$ | 13.1 |
| $3 LiAlH_4 + 4NH_3$ | $3AlN + Li_3N + 12H_2$ | 13.3 |
| $NH_4F + LiBH_4$ | $4H_2 + BN + LiF$ | 13.6 |
| $N_2H_4 + 2NH_3 + Catalyst$ | $5H_2 + 2N_2$ | 15.1 |
| $0.5NH_3BH_3 + 0.3N_2H_4 \cdot 2BH_3 + 0.098(NH_4)_2B_{10}H_{10} + 0.102NH_4NO_3$ | 94% pure $H_2$ | 16.52 |

Figure 6:
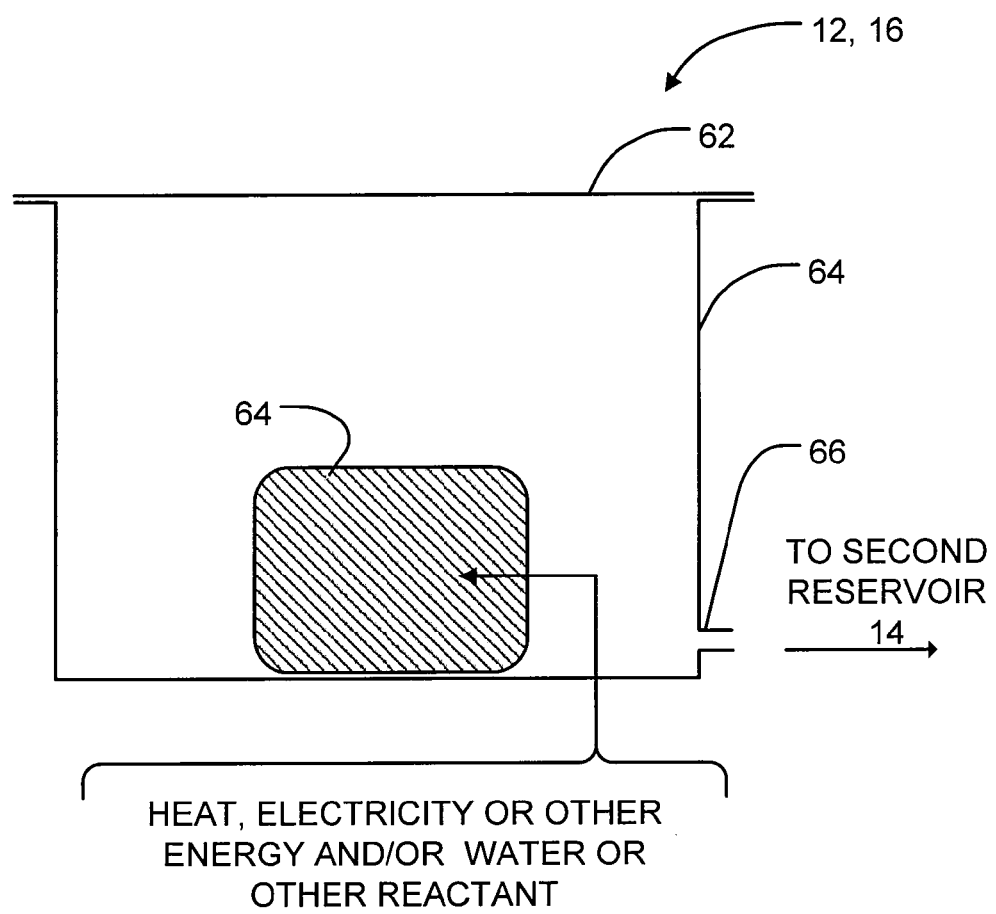
FIG. 6 shows another type of first hydrogen reservoir as may be used in some embodiments of the invention.

FIG. 6 is a schematic illustration of a first hydrogen reservoir 12 containing a dry hydride or other hydrogen-containing material. In this embodiment, first hydrogen reservoir 12 also serves as a part of converter 16. Converter 16 comprises means for adding water or one or more other reactants to the dry hydrogen-containing material, and/or heating the hydrogen-containing material. The hydrogen-containing material participates in a reaction that releases hydrogen upon the addition of water or other reactants and/or upon heating. The hydrogen gas can then be transferred to the second hydrogen reservoir 14.

The first hydrogen reservoir 12 shown in FIG. 6 comprises a container 60 having a lid 62 or other access port that can be opened to insert a dry hydrogen-containing material 64 into container 60. An outlet 66 carries hydrogen to second hydrogen reservoir 14.

If the hydrogen produced by converter 16 is impure or in other ways incompatible with second hydrogen reservoir then apparatus 10 may comprise hydrogen treatment stages between converter 16 and second hydrogen reservoir 14. For example, a converter which works by electrolysis or hydrolysis may produce hydrogen that is saturated with water. A drier may be provided in converter 16 or between converter 16 and second hydrogen reservoir 14. The drier may comprise one or more of:

a material such as DRIERITE™, silica gel, or another suitable dessicant;

a condenser; or, another suitable dryer.

FIG. 3 shows a drier 31. Driers may also be provided in other embodiments. In some embodiments hydrogen is produced by electrolysis of water at a pressure significantly greater than a pressure of the second hydrogen reservoir. The water concentration of the hydrogen is reduced when the hydrogen passes through a pressure drop into the second hydrogen reservoir.

Figure 7:
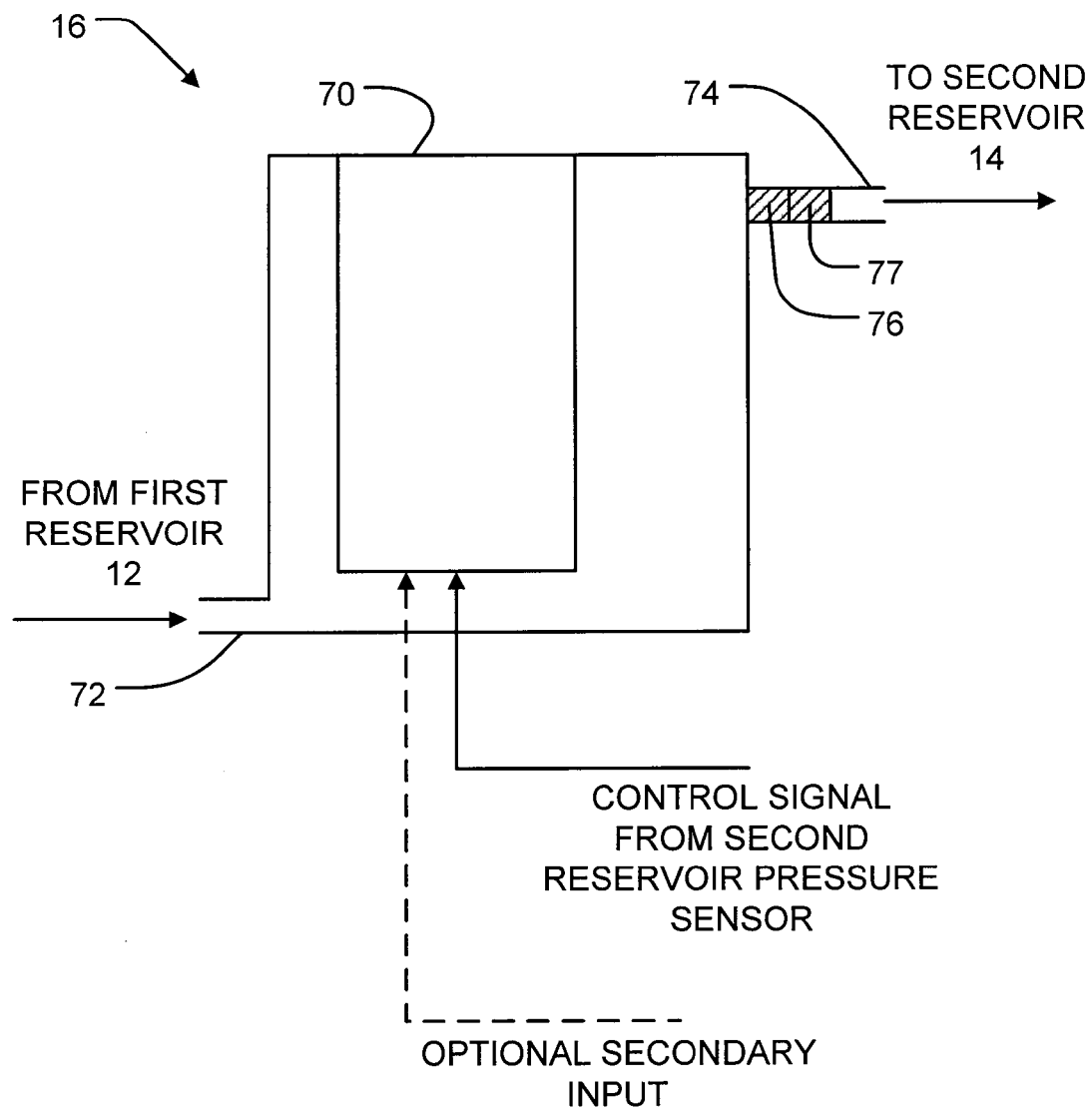
FIG. 7 shows schematically a converter as may be used in some embodiments of the invention.

As another example, when hydrogen is stored in the first hydrogen reservoir 12 in the form of a hydride, impurities may be entrained in the hydrogen stream produced when the hydride is hydrolyzed of thermolized. In this case, a filter may be provided between converter 16 and second hydrogen reservoir 14. The filtration may comprise a membrane that acts as a molecular sieve allowing hydrogen to pass while restricting the passage of impurities. By way of example, such membranes may be made from metals, such as palladium, polymers, such as polypropylene, or suitable ceramics such as suitable zeolites. In some embodiments, a contaminant absorber is provided between first and second reservoirs 12, 14. The contaminant absorber may remove contaminating gases such as oxygen, carbon monoxide, carbon dioxide, or the like. In some embodiments, the contaminant absorber may comprise a field-replaceable module. A filter 76 and a contaminant absorber 77 are shown in FIG. 7. Suitable filters, driers, contaminant absorbers, and/or other means for conditioning hydrogen may be provided in any embodiment of the invention.

In some embodiments, first hydrogen reservoir is constructed and/or operated in the manner described in U.S. patent application Ser. No. 11/288,158 filed on 29 Nov. 2005 and entitled HYDROGEN FUEL DELIVERY SYSTEMS and on U.S. application Ser. No. 60/631,164 filed on 29 Nov. 2004 and entitled, HYDROGEN FUEL DELIVERY SYSTEMS both of which are hereby incorporated herein by reference.

FIG. 7 is a schematic illustration of a converter 70 which represents one possible embodiment of converter 16. Converter 70 comprises an input 72 and an output 74. A filter 76 and a contaminant absorber 77 are located in output 74.

In some embodiments, hydrogen is provided in the first hydrogen reservoir 12 in the form of a dry hydrogen-containing material and the converter generates hydrogen for second hydrogen reservoir 14 by mixing the dry hydrogen-containing material with water. The conversion occurs when the water and dry chemical undergo a hydrolysis reaction, which releases hydrogen gas. In such embodiments, the converter may comprise a container in which the hydrogen-containing material is mixed with water. In such embodiments, first hydrogen reservoir 12 and converter 16 may share the same container. The water may be pure but is not necessarily pure. In most cases, reasonable amounts of impurities of the type that may be found in tap water or even pond water or groundwater will not significantly affect the quality of hydrogen produced by the hydrolysis reaction.

In some embodiments, an amount of water that is at least sufficient to generate a predetermined mass of hydrogen is added to the dry hydrogen-generating material and the resulting hydrolysis reaction is allowed to go to completion at whatever rate it proceeds. By making second hydrogen reservoir 14 large enough to safely contain all hydrogen generated when a hydrolysis reaction (or other conversion) goes to completion, it becomes impossible to overcharge second hydrogen reservoir 14. A safety mechanism may be provided to prevent overfilling second hydrogen reservoir 14. The safety mechanism may comprise a pressure-relief valve, for example.

In some embodiments, the hydrogen is converted from the first form to the second form by a thermolysis reaction. In a thermolysis reaction a hydrogen-containing material is heated to a point where hydrogen is spontaneously generated. The hydrogen-containing material may be a suitable liquid or solid that undergoes thermolysis at an accessible temperature.

The hydrogen-containing material in first hydrogen reservoir 14 may be very safe for handling at ambient temperatures and selected to generate hydrogen only at moderate temperatures that can be easily achieved with a low-grade heat source. Examples of low-grade heat sources include: combustion via open flames, electrical heating elements, heat pumps or solar heaters. In all cases heat is concentrated on at least a portion of the hydrogen-containing material so that hydrogen is generated. When the heat is removed hydrogen generation stops.

Figure 8:
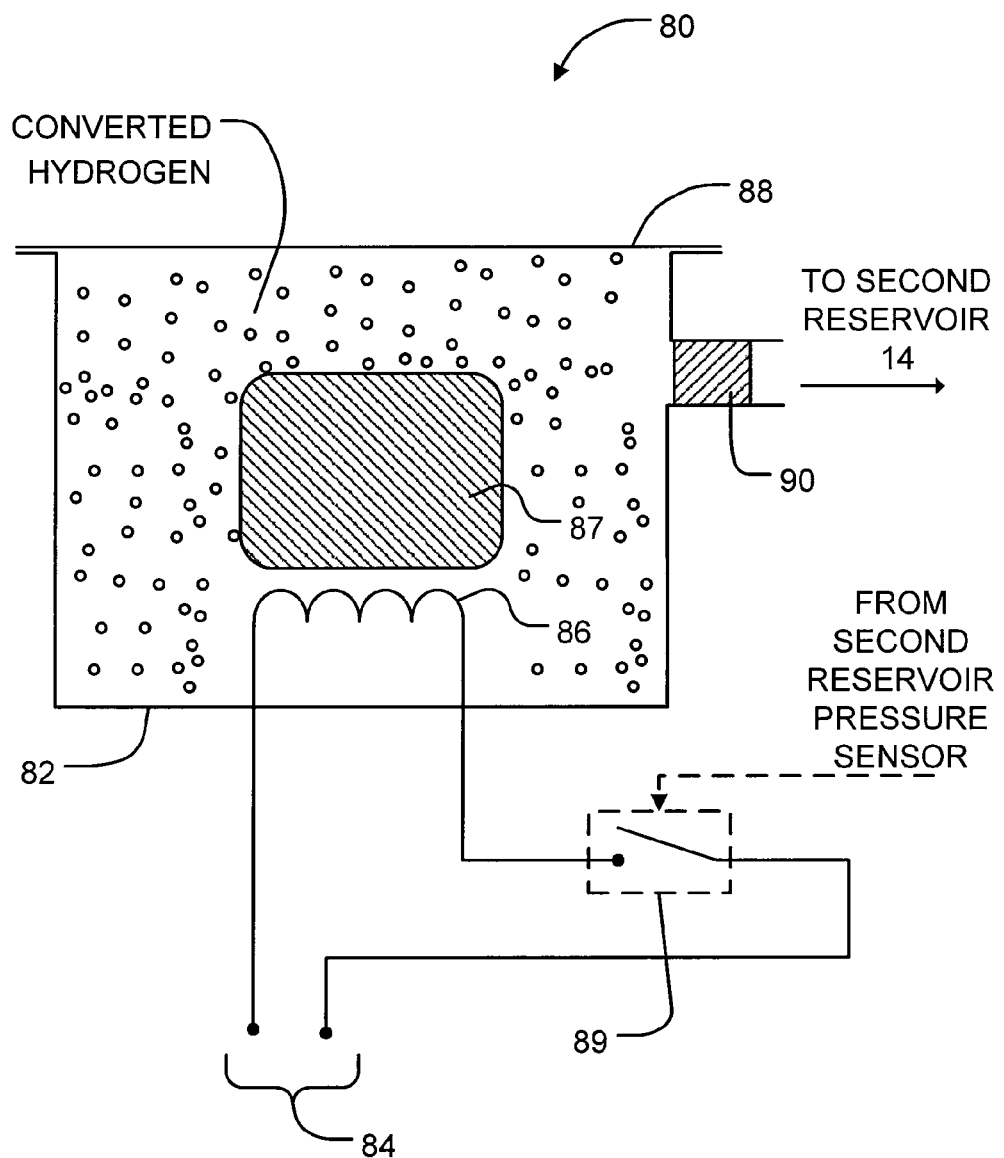
FIG. 8 shows a combined converter and first hydrogen reservoir as may be used in some embodiments of the invention.

FIG. 8 is a schematic illustration of a combined converter and first hydrogen reservoir 80. Converter 80 comprises a container 82. An electrical source 84 is connected to a resistive heater 86 that is located within first hydrogen reservoir container 82. Dry hydrogen-containing material 87 that will undergo the planned thermolysis reaction is introduced into container 82 through an access port 88.

When the pressure in second hydrogen reservoir 14 is low, pressure activated switch 89 closes the electrical circuit so resistive heater 86 generates heat. This heat triggers the thermolysis reaction to generate hydrogen gas in container 82 at arbitrary pressures. The resulting hot, dry, mildly pressurized hydrogen flows through a filter 90 into second hydrogen reservoir 14 until pressure in the second hydrogen reservoir pressure builds to a point at which the resistive heater circuit is opened. When this state is achieved the overall system will be at a state of readiness for refueling portable devices 24.

Thermolysis reactions are a good mechanism for generating hydrogen. Some advantages of generating hydrogen in a thermolysis reaction include:

Thermolysis reactions can generate large amounts of hydrogen from hydride materials and produce dry hydrogen without significant entrained water.

A thermolysis reaction can be controlled by controlling the heat being applied.

Thermolysis can be performed using chemical hydrides that have been stabilized within an inert material. Such materials can be safe, flame-resistant and impervious to environmental attack.

A heat pump may be used to provide heat to cause thermolysis.

In some embodiments, first reservoir comprises a hydrogen-storing material that reversibly occludes hydrogen by adsorption, absorption, a reversible chemical change or the like. FIG. 4A shows an optional hydrogen-storing material 47 in first reservoir 12.

Various components of apparatus according to the invention may optionally be made to be field-serviceable. For example, a hydrogen-storing material 37 in second hydrogen reservoir 14 could become degraded and need replacing. Second hydrogen reservoir 14 may be configured as a module that can be easily replaced in the field.

Consider, as an example, apparatus 10 according to an embodiment wherein a hydrogen-containing material is subjected to thermolysis or hydrolysis and the resulting hydrogen gas is transferred to a second hydrogen reservoir where it is occluded by a suitable hydrogen-storing material. Such apparatus can have a number of advantageous features including the following:

- Transfer of hydrogen into a portable device 24 can be facilitated by the synergies between a hydrogen-storing material in the second hydrogen reservoir and another hydrogen-storing material in the portable device.
- The overall weight of the apparatus can be reduced. Hydrogen-storing materials such as metal hydrides can be fairly heavy. Most hydrogen can be stored in a first hydrogen reservoir that is gravimetrically efficient. Since second hydrogen reservoir needs to contain no more hydrogen than is required for immediate use, the amount of hydrogen-storing material may be relatively small in comparison to the amount that would be required to hold all of the hydrogen in both the first and second reservoirs.
- Provision of a hydrogen-storing material in the second hydrogen reservoir can filter impurities from hydrogen before the hydrogen is transferred to a portable device.
- The apparatus can be simple, it does not require any compressors, pumps or other complicated, heavy, high-maintenance components.
- Hydrogen may be introduced to the apparatus in the form of inexpensive, safe, convenient, and durable pre-measured hydrogen-containing materials.
- In embodiments which use thermolysis to convert the hydrogen to a gas form the conversion can be readily controlled.
- In embodiments which use hydrolysis to convert the hydrogen to a gas form the conversion does not need to be controlled if the hydrogen-containing material is converted only in pre-measured quantities which are small enough so as to not overtax the apparatus.
- The condition (pressure, temperature, etc.) of hydrogen in the second hydrogen reservoir may be selected to facilitate rapid transfer of hydrogen to a portable device.

While a number of exemplary aspects and embodiments have been discussed above, those of skill in the art will recognize certain modifications, permutations, additions and sub-combinations thereof. For example:

- apparatus 10 could comprise a computer-based or hard wired control system that provides functions such as automatically shutting down apparatus 10 in the event of a system malfunction or keeping statistics about the usage of apparatus 10.
- Control signal 20 may be transmitted through a hard wired system, a wireless system, combinations thereof, or some other suitable means of communicating.
- As is apparent from the various examples provided herein, first hydrogen reservoir 12 and converter 16 may be separate and distinct components or may be coupled into an integrated device.

It is therefore intended that the following appended claims and claims hereafter introduced are interpreted to include all such modifications, permutations, additions and sub-combinations as are within their true spirit and scope.

The invention claimed is:

1. A hydrogen supply system comprising:
   a first hydrogen reservoir for containing hydrogen in a first form;
   a converter adapted to convert the first form of hydrogen to hydrogen gas, wherein the converter includes a hydrolysis reactor, a galvanic cell, or a heater;
   a second hydrogen reservoir wherein the second hydrogen reservoir includes a hydrogen occluding material;
   a hydrogen transfer interface that is in fluid communication with the second hydrogen reservoir and includes a portable device fluidic coupling; and
   a portable electronic device removably attached to the portable device fluidic coupling, wherein the portable electronic device includes a hydrogen storing material within a fuel reservoir and wherein the system is adapted to fill the fuel reservoir with hydrogen gas from the second hydrogen reservoir and wherein the hydrogen transfer interface includes a thermally-conductive pathway between the hydrogen occluding material of the second reservoir and the hydrogen storing material in the hydrogen storing reservoir of the portable device; and
   wherein the system is devoid of compressors for compressing hydrogen.

2. A hydrogen supply system according to claim 1, wherein the first form of hydrogen comprises sodium borohydride, sodium silicide, potassium borohydride, lithium borohydride, lithium alanate, sodium alanate, borazane, ammonium chloride, ammonium fluoride, magnesium hydride, titanium hydride, iron magnesium hydride, ammonia, hydrazine, silanes, hydrocarbons, water, chemical hydrides or combinations thereof.

3. A hydrogen supply system according to claim 1, wherein the first form of hydrogen comprises a metal or metal alloy.

4. A hydrogen supply system according to claim 1, further comprising a port through which the hydrogen in the first form can be introduced into the first reservoir, the port comprising a closure.

5. A hydrogen supply system according to claim 4, comprising a lockout mechanism, the lockout mechanism preventing opening of the closure whenever the second reservoir contains more than a threshold amount of hydrogen.

6. A hydrogen supply system according to claim 1, further including a lockout mechanism actuatable by expansion of the hydrogen occluding material.

7. A hydrogen supply system according to claim 1, wherein the converter comprises a reformer, a catalyst, or combinations thereof.

8. A hydrogen supply system according to claim 1, further comprising a catalyst.

9. A hydrogen supply system according to claim 1, further comprising a source of water.

10. A hydrogen supply system according to claim 1, wherein, in the first form, the hydrogen comprises hydrogen in a hydrogen-containing solid material and the converter is a heater disposed to heat the solid material to release the hydrogen gas.

11. A hydrogen supply system according to claim 1, wherein the system includes a plurality of interchangeable adaptors for the hydrogen transfer interface, each of the adaptors configured to couple with a different kind of portable device.

12. A hydrogen supply system according to claim 1, wherein the portable electronic device comprises a removable hydrogen reservoir, a satellite cartridge, a replaceable fuel cartridge or combinations thereof.

13. The hydrogen supply system according to claim 1, wherein the converter is a separate and distinct component from the first hydrogen reservoir and wherein the system is adapted to direct hydrogen in its first form out of the first hydrogen reservoir and into the converter.

14. The hydrogen supply system according to claim 13, wherein the converter is a chamber intermediate between the first hydrogen reservoir and the second hydrogen reservoir, wherein the chamber can be placed in fluid communication with the first hydrogen reservoir by way of a first valve and wherein the chamber can be placed in fluid communication with the second hydrogen reservoir by way of a second valve.

15. The hydrogen supply system according to claim 14, wherein the system is adapted to open the first and second valves in alternation to allow transfer of hydrogen into the second hydrogen reservoir while keeping a pressure within the second hydrogen reservoir lower than a pressure within the first hydrogen reservoir.

16. The hydrogen supply system according to claim 13, wherein the first hydrogen reservoir has a single valve that controls both refilling of the first hydrogen reservoir and a flow of hydrogen to the converter.

17. The hydrogen supply system according to claim 13, wherein the converter includes a source of water or energy.

18. The hydrogen supply system according to claim 1, wherein the system further includes a regulator configured to regulate the pressure of hydrogen flowing from the second hydrogen reservoir to the portable device fluidic coupling.

19. A hydrogen supply system according to claim 10, wherein the first form of hydrogen comprises sodium borohydride, sodium silicide, potassium borohydride, lithium borohydride, lithium alanate, sodium alanate, borazane, ammonium chloride, ammonium fluoride, magnesium hydride, titanium hydride, iron magnesium hydride, ammonia, hydrazine, silanes, hydrocarbons, water, chemical hydrides or combinations thereof.

20. The hydrogen supply system according to claim 10, wherein the system further includes a regulator configured to regulate the pressure of hydrogen flowing from the second hydrogen reservoir to the portable device fluidic coupling.

21. A hydrogen supply system comprising:
   a first hydrogen reservoir for containing hydrogen in a first form and adapted to convert the first form of hydrogen to a hydrogen gas;
   a second hydrogen reservoir for containing hydrogen in a second form different from the first form, wherein the second hydrogen reservoir is in fluid communication with the first hydrogen reservoir;
   a hydrogen transfer interface that is in fluid communication with the second hydrogen reservoir and includes a portable device fluidic coupling; and
   a portable electronic device removably attached to the portable device fluidic coupling, wherein the portable electronic device includes a fuel reservoir and wherein the system is adapted to fill the fuel reservoir with hydrogen gas from the second hydrogen reservoir;
   wherein the system is devoid of compressors for compressing hydrogen and wherein the first hydrogen reservoir includes a lid that can be opened to insert the first form and wherein the system is configured to transfer hydrogen to the hydrogen reservoir of the portable device without transferring additional hydrogen from the first hydrogen reservoir to the second hydrogen reservoir.

22. The hydrogen supply system according to claim 21, wherein the system further includes a regulator configured to regulate the pressure of hydrogen flowing from the second hydrogen reservoir to the portable device fluidic coupling.

* * * * *